May 13, 1924.
C. E. FREDERICKSON
1,493,524
COMBINED WEIGHT SUPPORTING SPRING, SHOCK ABSORBER,
AND RECOIL AND REBOUND SPRING
Original Filed July 19, 1920    2 Sheets-Sheet 1
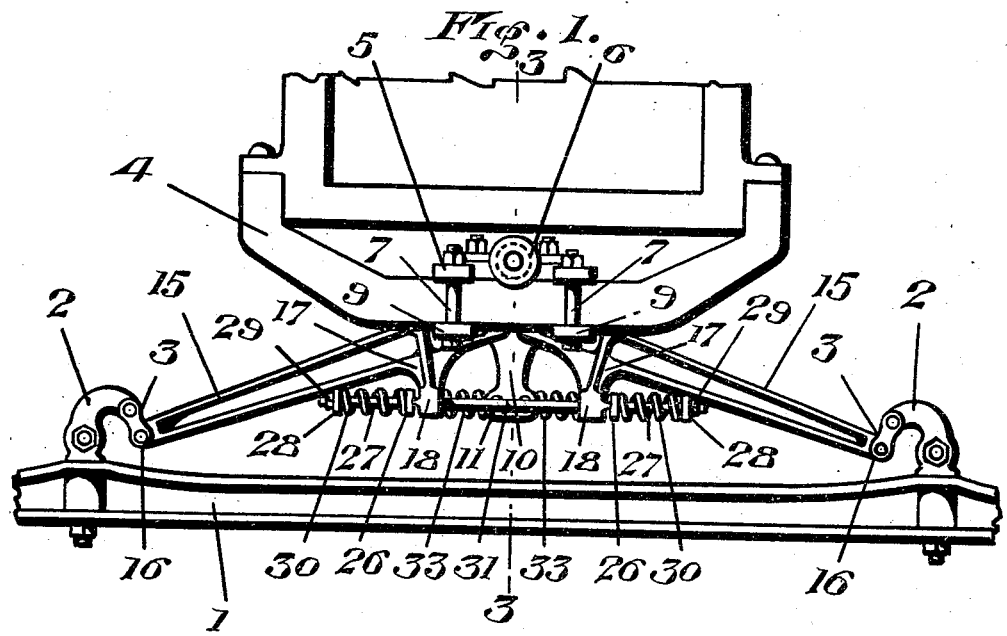
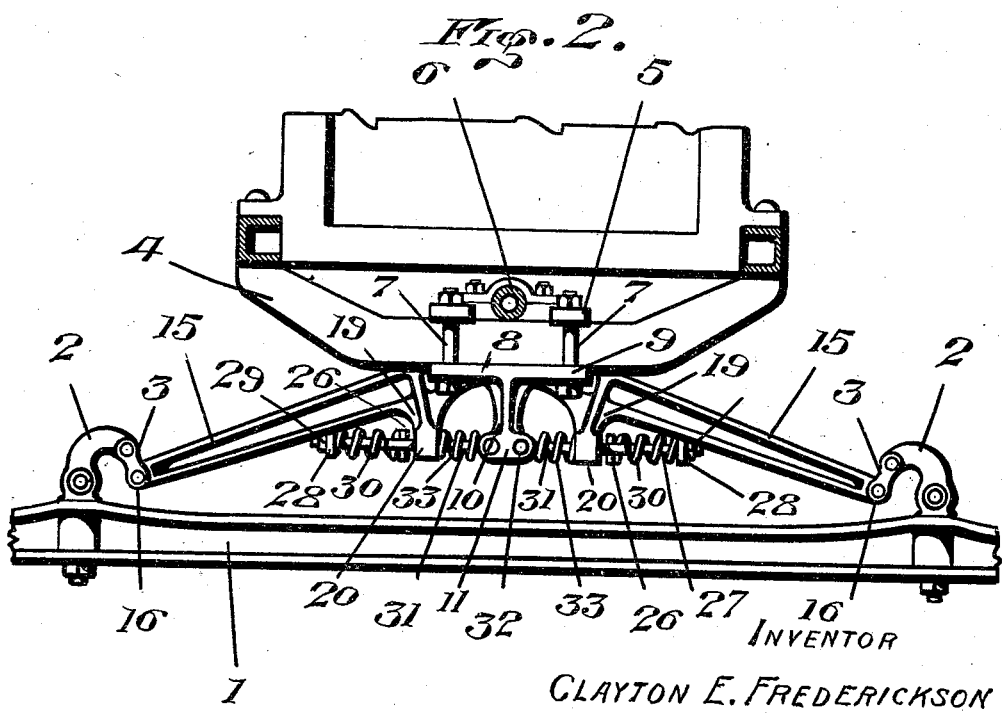
INVENTOR
CLAYTON E. FREDERICKSON
By Fred Y. Dieterich
ATTORNEYS May 13, 1924. 1,493,524
C. E. FREDERICKSON
COMBINED WEIGHT SUPPORTING SPRING, SHOCK ABSORBER,
AND RECOIL AND REBOUND SPRING
Original Filed July 19, 1920  2 Sheets-Sheet 2
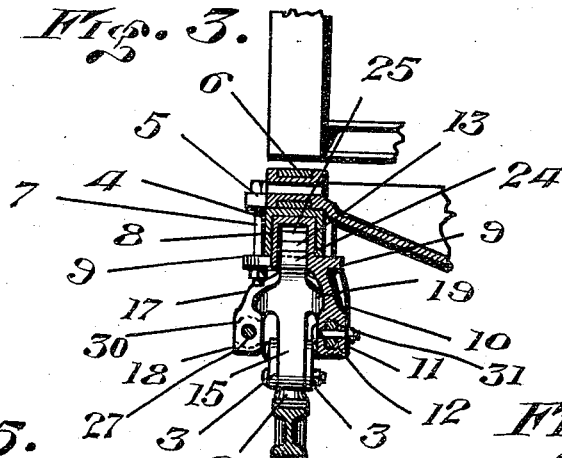
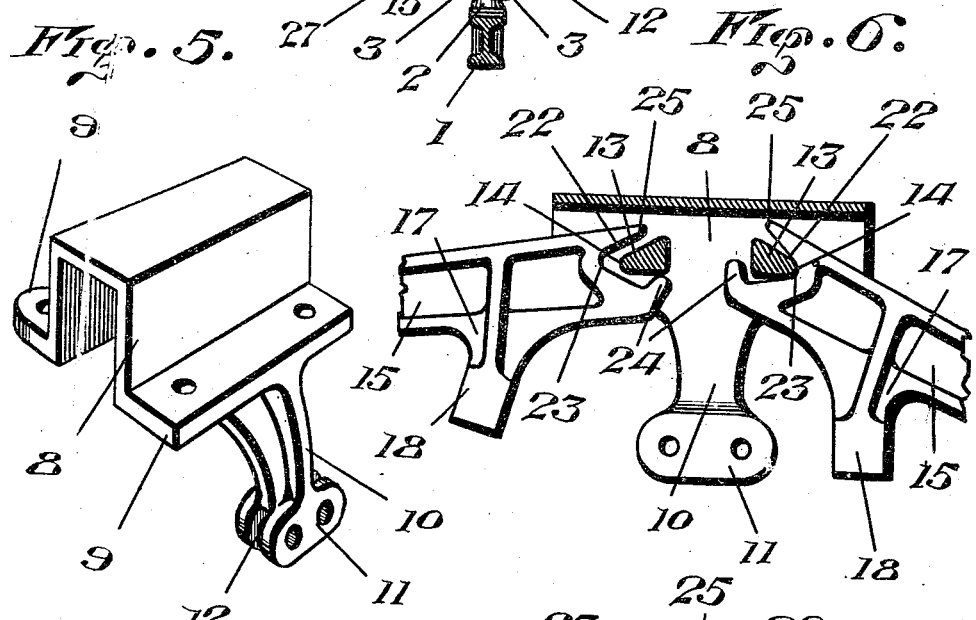
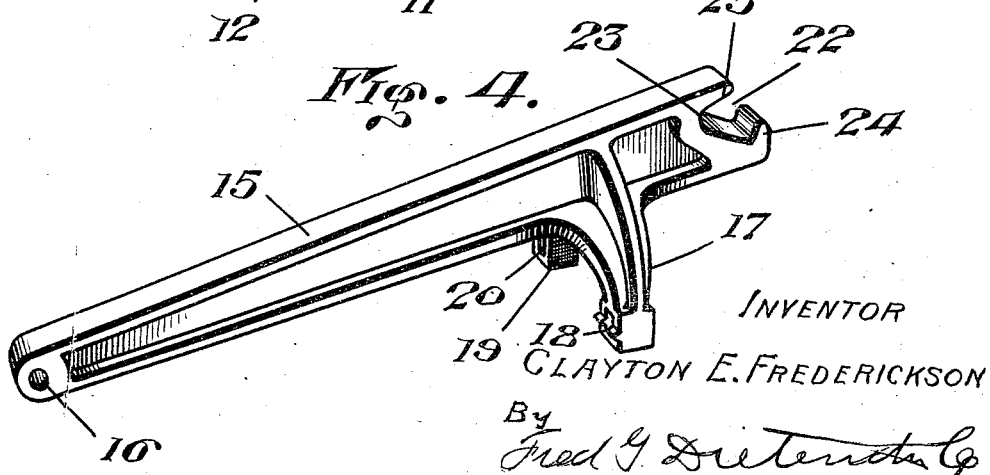
INVENTOR
CLAYTON E. FREDERICKSON
By Fred G. Dieterich Co
ATTORNEYS Patented May 13, 1924.

1,493,524

UNITED STATES PATENT OFFICE.

CLAYTON E. FREDERICKSON, OF CHICAGO, ILLINOIS.

COMBINED WEIGHT-SUPPORTING SPRING, SHOCK ABSORBER, AND RECOIL AND REBOUND SPRING.

Application filed July 19, 1920, Serial No. 397,356. Renewed October 30, 1923.

*To all whom it may concern:*

Be it known that I, CLAYTON E. FREDERICKSON, a citizen of the United States, residing at Chicago, in the county of Cook and State of Illinois, have invented certain new and useful Improvements in Combined Weight-Supporting Springs, Shock Absorbers, and Recoil and Rebound Springs, of which the following is a specification.

My invention, which has been especially designed for use on the well-known Ford Model T automobile as a front "spring," has for its primary object to eliminate the front spring pack now employed on that automobile and the substitution therefor of a mechanism which will not only perform the functions of the original weight supporting spring for which it is substituted but will also act as a shock absorber and as a recoil and rebound spring.

In its general nature, the invention comprises a pair of levers, one end of each of which is shackled to the spring support of the axle and the other end of each of which is rockably held in engagement with abutments secured on the front cross yoke of the frame in approximately the vertical plane containing the axis of rotation of the crank shaft, the levers being connected together by coil springs and being connected with a fixed arm also carried on the cross yoke of the frame in such manner as to hold the levers in a position to sustain the weight of the body of the vehicle and also to prevent side sway of the body and to absorb the shocks and recoil, etc.

In its more detail nature, the invention includes those novel details of construction, combination and arrangement of parts, all of which will be first fully described, then be specifically pointed out in the appended claims and illustrated in the accompanying drawing, in which:

Figure 1 is a detail front elevation of a Ford car showing the invention applied.

Figure 2 is a detail rear elevation of the same.

Figure 3 is a detail vertical section on the line 3—3 of Figure 1.

Figure 4 is a detail perspective view of one of the levers.

Figure 5 is a detail perspective view of the "adapter."

Figure 6 is a detail vertical section of the "adapter", showing the abutments and the manner of assembling the levers with the same.

In the drawing, in which like letters and numerals of reference indicate like parts in all of the figures, 1 represents the front axle, 2 the posts mounted on the axle to which the spring shackles 3 are pivoted and 4 indicates the front frame yoke on which the bearing member 5 for the front suspension of the engine unit is secured by the bolts 7 in the usual manner, the bearing 5 having an opening 6 for the front end of the engine unit.

8 designates an "adapter" which consists of a U shaped body in end elevation having lugs 9 for the bolts 7 and having an arm 10 terminating in a socket 11 in the opening 12 of which the eyes of the spring rods 31 are held on pivots 32.

The "adapter" is provided with two abutments 13—13 shaped to provide a roller bearing edge 14 to engage the crotch 23 of the opening in the upper end of the respective levers 15. The levers 15 have eyes 16 to connect with the shackles 3 and at their other or upper ends are slotted as at 22 to provide the recesses for the abutment 13. Each lever has a projection 24 to engage the back of the adjacent abutment 13 when the body of the car is thrown upwardly to prevent disconnection of the lever from the abutment and the end 25 of the lever projects over the abutment to a place approximately over the projection 24, leaving, however, a sufficient opening 22 for the passage of the abutment 13 when assembling the parts.

The lever 15 also has a pair of arms 17—19 terminating in apertured ears 18—20.

Passing through the ears 18 of the front arms 17 is a rod 27 which is provided at its ends with suitable washers 28 and nuts 29 between which and the ears 18 the weight supporting springs 30 are placed, there being washers 26 interposed between the ends of the springs 30 and the adjacent ears 18, which washers have knife edge bearing contact with such ears, as indicated in the drawing.

The rods 31, which are pivoted at 32 to the end 11 of the arm 10 project through the ears 20 and coil springs 33 are located on such rods 31 to act as recoil springs, thus the springs 30 and 33 not only serve to sustain the weight of the rod but also act as shock absorbing springs and the provision of the springs 33 and rods 31 with the laterally non-shiftable connection between the rods 31 and the arms 17 serve to prevent sidewise motion of the body of the vehicle and thus hold the same balanced so as not to rock the body.

From the foregoing description, taken in connection with the accompanying drawing, it is thought the complete construction, operation and advantages of the invention will be readily understood by those skilled in the art to which the invention appertains.

What I claim is:

1. In combination with the axle and the front frame yoke of a motor vehicle: of a pair of levers one end of each of which is connected with the axle and the other end of each of said levers being located in proximity to the longitudinal axis of the vehicle, of a central pivotal support secured to the front frame yoke and having provision for engaging the adjacent ends of the levers and means connecting the levers to sustain the load, said levers being pivoted at their adjacent ends to said central pivot support.

2. In combination with the axle and the front frame yoke of a motor vehicle: of a pair of levers one end of each of which is connected with the axle and the other end of each of said levers being located in proximity to the longitudinal axis of the vehicle, of a central pivotal support secured to the front frame yoke and having provision for engaging the adjacent ends of the levers, and resilient means connecting the levers to sustain the load, said levers being pivoted at their adjacent ends to said central pivot support.

3. In combination with the axle and the front frame yoke of a motor vehicle; of a pair of levers one end of each of which is connected with the axle and the other end of each of said levers being located in proximity to the longitudinal axis of the vehicle, of a central pivotal support secured to the front frame yoke and having provision for engaging the adjacent ends of the levers, means connecting the levers to sustain the load, and means holding the body of the vehicle against pivotal side sway, said levers being pivoted at their adjacent ends to said central pivot support.

4. In combination with the axle and the front frame yoke of a motor vehicle; of a pair of levers one end of each of which is connected with the axle and the other end of each of said levers being located in proximity to the longitudinal axis of the vehicle, of a central pivotal support secured to the front frame yoke and having provision for engaging the adjacent ends of the levers, resilient means connecting the levers to sustain the load, and means for holding the body of the vehicle against pivotal side sway, said levers being pivoted at their adjacent ends to said central pivot support.

5. In combination with the axle and the front frame yoke of a motor vehicle: of a pair of levers one end of each of which is connected with the axle and the other end of each of said levers being located in proximity to the longitudinal axis of the vehicle, of a central pivotal support secured to the front frame yoke and having provision for engaging the adjacent ends of the levers, resilient means connecting the levers to sustain the load, and other means cooperative with said resilient means for absorbing shocks and recoil, said levers being pivoted at their adjacent ends to said central pivot support.

6. In a motor vehicle, the combination with the axle and the frame, of a central pivotal support secured to the frame and having abutments, a pair of levers one end of each of which engages the respective abutments, and the other end of each of which is connected with the axle, said pivotal support having an arm, said levers having arms, resilient members connecting an arm of one lever with an opposite arm of the other lever to sustain the load, other resilient means interposed between the arm of said pivotal support and an arm of each lever for absorbing the recoil.

7. In apparatus of the class described, in combination with the frame of the vehicle and the axle; of a pair of levers, one end of each of which is connected with the axle, a central pivotal support secured to the frame of the vehicle and having abutments against which the other end of each of said levers respectively engage, each of said levers having a pair of arms provided with ears, a rod passed through an arm of each lever, load sustaining springs on said rod engaging the respective lever arms, said pivotal support having an arm, rods connected with said pivotal support arm and projecting through the respective ears of the lever arms and provided with recoil springs, substantially as shown.

8. In a motor vehicle, the combination with the axle and the frame of a member secured to the frame and having pivot abutments, a pair of levers, one end of each of which engages the respective abutments and the other end of each of which is connected with the axle, said member having an arm, said levers having arms intermediate the places where the levers are connected with the axle and engage the abutments, resilient members connecting an arm of one lever with an opposite arm of the other lever to sustain the load, and other resilient means interposed between the arm of said member and an arm of each lever for absorbing recoil.

9. The combination with the axle and the frame of a motor vehicle, a member secured to the frame to lie adjacent to the longitudinal axis thereof, said member having a pair of lever abutments and having an arm, a pair of levers each comprising a rigid arm, one end of which is pivotally connected with the axle of the vehicle and the other end of which is recessed to detachably engage an abutment of said member, and shock absorbing and recoil spring devices connecting said levers and the arm of said member.

10. The combination with the axle and the frame of a motor vehicle, a member secured to the frame to lie adjacent to the longitudinal axis thereof, said member having a pair of lever abutments and having an arm, a pair of levers each comprising a rigid arm, one end of which is pivotally connected with the axle of the vehicle and the other end of which is recessed to detachably engage an abutment of said member, said levers each having a pair of arms, a rod projected through one of the arms of each lever and springs carried on said rod cooperating with the adjacent arms of said levers, other rods connected to the arm of said member and passing through the opposing other arms of said levers and coil springs on said last-named rods cooperating with said other arms of said levers for the purposes described.

CLAYTON E. FREDERICKSON.